US007066886B2

(12) United States Patent
Song et al.

(10) Patent No.: US 7,066,886 B2
(45) Date of Patent: Jun. 27, 2006

(54) ULTRASOUND IMAGING SYSTEM AND METHOD BASED ON SIMULTANEOUS MULTIPLE TRANSMIT-FOCUSING USING WEIGHTED ORTHOGONAL CHIRP SIGNALS

(75) Inventors: Tai Kyong Song, Seoul (KR); Young Kwan Jeong, Seoul (KR)

(73) Assignee: Medison Co., Ltd., Kangwon-Do (KR)

( * ) Notice: Subject to any disclaimer, the term of this patent is extended or adjusted under 35 U.S.C. 154(b) by 511 days.

(21) Appl. No.: 10/184,731

(22) Filed: Jun. 27, 2002

(65) Prior Publication Data
US 2004/0034305 A1 Feb. 19, 2004

(30) Foreign Application Priority Data
Dec. 26, 2001 (KR) ................ 2001-84958

(51) Int. Cl.
*A61B 8/00* (2006.01)
(52) U.S. Cl. .................................... 600/443
(58) Field of Classification Search ........... 600/443, 600/447, 454–456, 458; 128/916
See application file for complete search history.

(56) References Cited

U.S. PATENT DOCUMENTS

| | | | | |
|---|---|---|---|---|
| 5,113,706 A | * | 5/1992 | Pittaro | 73/626 |
| 5,984,869 A | * | 11/1999 | Chiao et al. | 600/437 |
| 6,048,315 A | * | 4/2000 | Chiao et al. | 600/447 |
| 6,108,273 A | * | 8/2000 | Hossack et al. | 367/138 |
| 6,179,780 B1 | * | 1/2001 | Hossack et al. | 600/437 |
| 6,213,947 B1 | * | 4/2001 | Phillips | 600/443 |
| 6,277,073 B1 | * | 8/2001 | Bolorforosh et al. | 600/437 |
| 6,315,723 B1 | * | 11/2001 | Robinson et al. | 600/443 |
| 6,547,733 B1 | * | 4/2003 | Hwang et al. | 600/437 |
| 6,638,227 B1 | * | 10/2003 | Bae | 600/443 |

FOREIGN PATENT DOCUMENTS

| | | |
|---|---|---|
| JP | 8024258 | 1/1996 |
| JP | 10177072 | 6/1998 |
| WO | 00/57769 | 10/2000 |

* cited by examiner

OTHER PUBLICATIONS

Japan Office Action, application No. 2001-402093, date of mailing Dec. 11, 2003.

*Primary Examiner*—Francis J. Jaworski
(74) *Attorney, Agent, or Firm*—Thelen Reid & Priest LLP; David B. Ritchie

(57) ABSTRACT

The present invention discloses an ultrasound imaging system and method based on simultaneous multiple transmit-focusing using the weighted orthogonal chirp signals so that resolution of an ultrasound image is enhanced without sacrifice in the frame rate. The ultrasound imaging system according to the present invention includes: a storing means for storing weighted orthogonal signals including N number of orthogonal codes wherein the orthogonal codes are orthogonal to each other; a transmitter for transmitting simultaneously the weighted orthogonal signals as ultrasound transmission signals to corresponding N number of focal points within the target object; a receiver for receiving signals reflected from the N number of focal points corresponding to the transmitted ultrasound signals; a pulse-compressor for pulse-compressing with respect to each orthogonal code by extracting the stored N number of orthogonal codes from the reflected signals; a producer for producing receive-focused signals from the pulse-compressed signals; and a display for displaying the receive-focused signals by processing them. As a result, transmission signals are simultaneously transmitted to the plurality of focal points and received signals are separated on reception, thereby improving resolution without sacrifice in the frame rate.

13 Claims, 16 Drawing Sheets

Fig. 5A
(Prior Art)
Fig. 5B
(Prior Art)
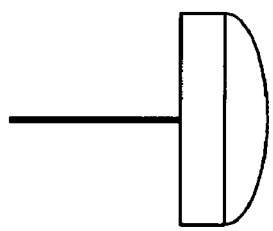
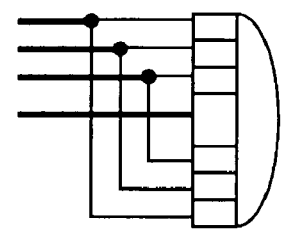
Fig. 6
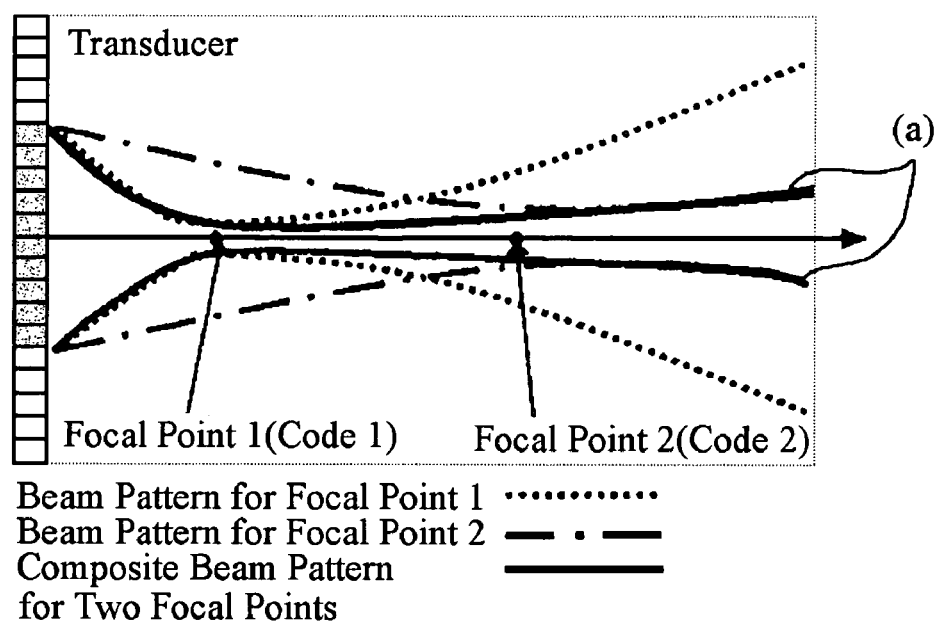

First, Second, Third Scan Lines

ULTRASOUND IMAGING SYSTEM AND METHOD BASED ON SIMULTANEOUS MULTIPLE TRANSMIT-FOCUSING USING WEIGHTED ORTHOGONAL CHIRP SIGNALS

FIELD OF THE INVENTION

The present invention relates to an ultrasound imaging system and method thereof, more particularly, to an ultrasound imaging system and method based on simultaneous multiple transmit-focusing using weighted orthogonal chirp signals so that resolution of an ultrasound image is enhanced without sacrifice in frame rate.

BACKGROUND OF THE INVENTION

The ultrasound imaging system is widely used in the medical field for displaying an image of a target object such as a human body. Ultrasound signals are transmitted to the target object and then reflected from the target object, thereby forming the ultrasound image.

In order to transmit the ultrasound signals, the ultrasound imaging system generally includes a transducer array, which includes a plurality of transducers and a pulser for driving each transducer. Each transducer generates ultrasound signals in response to the pulse applied from the pulser. During transmission of the ultrasound signal, a timing point of the ultrasound generation at each transducer is controlled, thereby transmit-focusing the ultrasound signals at a predetermined position within the target object. In other words, the pulser pulses the respective transducers with different time delays so that the ultrasound signals reach a desired position within the target object at the same time.

The ultrasound signals reflected from the target object are received by the transducer array. The time for the reflected signals to reach the respective transducers is different depending on the location of the transducers. Therefore, in order to compensate for the time difference among the transducers, a beamformer applies and adds the delayed time, with respect to the reflected signals, which are received by the respective transducers, and generates receive-focused signals.

The B-mode scanning technique, which provides two-dimensional (2-D) sectional images, is a very basic technique among various imaging techniques. Resolution, contrast and frame rate are critical factors in determining the quality of the ultrasound image. Among these factors, resolution is the most important index. It can be decomposed as follows: lateral resolution, the direction orthogonal to the direction of the traveling beam (i.e., the direction of the scan line); axial resolution, the direction in which the beam propagates; and elevational resolution, the direction orthogonal to the plane of the other two directions.

Since the late 1980s, electronic scanning techniques, wherein ultrasound signals are received by transducer arrays and focused in accordance with signal processing, have been used to improve resolution. FIG. 1 illustrates the conventional production of 2-D images using linear transducer arrays. When transducer array 1 is used, the lateral resolution at the focal points may be enhanced by increasing the number of channels. However, the resolution at locations other than the focal points is degraded.

Dynamic receive-focusing addressed this problem to make it possible to obtain high-resolution images at any viewing position. This technique is a significant improvement over the convention production of 2-D ultrasound images. However, this method can only provide optimum resolution in the vicinity of a fixed transmit focal depth. The resolution outside the vicinity of the focal depth is still degraded.

Multiple zone transmit-focusing overcomes this problem of resolution degradation by forming an image from the combination of images obtained from multiple transmission/reception processes for multiple focal points (depending on the positions of the scan lines according to their distances). An image is divided into several zones along the scan depth and ultrasound signals are transmitted with respect to every scan line as many time as the number of zones. FIGS. 2A to 2C illustrate a conventional multiple zone transmit-focusing technique where an image is divided into two zones. Referring to FIG. 2A, a transducer array transmits ultrasound signals to be focused at a first focal point Transmission Focal Point 1, thereby forming an image of a first zone Zone 1. Referring to FIG. 2B, the transducer array transmits ultrasound signals to be focused at a second focal point Transmission Focal Point 2, thereby forming an image of a second zone Zone 2. Referring to FIG. 2C, a final image is formed by combining the images of the first focal point Transmission Focal Point 1 and the second focal point Transmission Focal Point 2. Consequently, the entire beam pattern as well as the lateral resolution is greatly improved. However, since the frame rate decreases with the number of transmission/reception processes and ultrasound signals must be transmitted to each scan line as many times as the number of the focal points, this method causes a degradation in the frame rate.

Bi-directional dynamic focusing, a synthetic aperture technique, is another solution to the problem of resolution degradation. In order to obtain a single scan line, several transmission/reception processes are required. This delays the time for obtaining data and frequently introduces a phase distortion due to movement of the target object. Furthermore, when a single unit device is used to transmit ultrasound signals, the signal to noise ratio (SNR) is low.

Conventional B-mode ultrasound images of human soft tissue exhibit a speckle pattern, which shows up as grains in the image. The speckle pattern is an interference phenomenon, resulting from a plurality of minute scatterings of the transmission signal as it passes through the surrounding medium. The speckle pattern is different from the random noise distribution of a system. The speckle pattern coincides with the scan lines. Thus, the speckle patterns are not reduced by averaging the scan lines.

In order to reduce speckle patterns, conventional ultrasound imaging methods employ a frequency compounding method wherein the signal values obtained by repeated transmissions of ultrasound pulses having different center frequencies are averaged. Referring to FIG. 3, speckle patterns are reduced by obtaining and averaging the transmission value of a first pulse signal 1st having a first center frequency $f_1$ and a second pulse signal 2nd having a second center frequency $f_2$. However, this method also reduces the frame rate due to the number of transmission/reception processes.

FIGS. 4A and 4B illustrate a method for obtaining scan lines in a conventional ultrasound imaging system. While the conventional ultrasound imaging system forms a scan line with a single ultrasound transmission/reception process, FIGS. 4A and 4B illustrate three scan lines formed by three ultrasound transmission/reception processes. Referring to FIGS. 4A and 4B, the number of scan lines in a conventional system increases as the number of ultrasound transmission/reception processes increases, which leads to frame rate degradation.

Referring to FIG. 5A, in a conventional one-dimensional (1-D) transducer array, a mechanical lens is employed for resolving the elevational direction. Resolution quality of locations out of the focal point of the lens is remarkably low due to the fixed-focusing in both directions of transmission and reception. If another transducer array is added for resolution in the lateral direction, the transducer array becomes 2-D, which may raise the resolution quality but complicates the system.

Referring to FIG. 5B, if the system employs a 1.5-D transducer array having smaller transducer elements in the elevational direction, the system can alter transmission focal points, thereby improving the image resolution, but perform the dynamic receive-focusing with greatly simplified hardware. However, the elevational resolution of locations out of the fixed-focused regions is still slightly degraded.

SUMMARY OF THE INVENTION

It is, therefore, an objective of the present invention to solve the aforementioned problems by providing an ultrasound imaging method and system which is capable of simultaneous multiple transmit-focusing by using weighted orthogonal chirp signals, resulting in enhancement of resolution of ultrasound images without sacrifice in the frame rate.

Another objective of the present invention is to provide an ultrasound imaging method and system which is capable of improving the frame rate by obtaining a plurality of scan lines simultaneously using the weighted orthogonal chirp signals.

Still another objective of the present invention is to provide an ultrasound imaging method and system to which a frequency compounding method is applicable by using the simultaneous multiple transmit-focusing technique using the weighted orthogonal chirp signals without sacrifice in the frame rate.

Yet another objective of the present invention is to provide an ultrasound imaging method and system in which, during designing the weighted chirp signals in accordance with the frequency bandwidth division method, frequency variations with time of adjacent weighted chirp signals are arranged in an alternative manner and bandwidths thereof are overlapped as much as a predetermined width so that the chirp signals have orthogonal property.

According to one aspect of the present invention, an ultrasound imaging system includes: means for storing N number of weighted orthogonal signals; means for simultaneously transmitting the N number of weighted orthogonal signals as ultrasound transmission signals to a corresponding N number of focal points within a target object, the N number of weighted orthogonal signals being modified when propagating through the target object; means for receiving signals reflected from the N number of focal points corresponding to the transmitted signals, the received signals including the modified N number of weighted orthogonal signals; means for extracting the modified N number of weighted orthogonal signals from the received signals; means for pulse-compressing the modified N number of weighted orthogonal signals; and means for receive-focusing the pulse-compressed signals.

The pulse-compressing means further includes: a first correlator for pulse-compressing odd-numbered signals among the N number of weighted orthogonal signals; and a second correlator for pulse-compressing even-numbered signals among the N number of weighted orthogonal signals.

According to another aspect of the present invention, an ultrasound imaging method includes the steps of: preparing N number of weighted orthogonal signals; simultaneously transmitting the N number of weighted orthogonal signals as ultrasound transmission signals to a corresponding N number of focal points within a target object, the N number of weighted orthogonal signals being modified when propagating through the target object; receiving signals reflected from the N number of focal points corresponding to the transmitted ultrasound signals, the received signals including the modified N number of weighted orthogonal signals; extracting the modified N number of weighted orthogonal signals from the received signals; pulse-compressing the modified N number of orthogonal signals; and receive-focusing the pulse-compressed signals.

The ultrasound imaging method further includes the steps of: pulse-compressing odd-numbered signals among the N number of weighted orthogonal signals; and pulse-compressing even-numbered signals among the N number of weighted orthogonal signals.

BRIEF DESCRIPTION OF DRAWINGS

The above and other objects and features of the present invention will become apparent from the following description of the preferred embodiments given in conjunction with the accompanying drawings.

FIGS. 5A and 5B shows a one-dimensional (1-D) transducer array where focusing in the elevational direction is performed by means of a lens and a one-and-a-half dimensional (1.5-D) transducer array having seven transducer elements, respectively.

FIG. 6 shows the beam pattern of the simultaneous multiple transmit-focusing technique.

DETAILED DESCRIPTION OF THE PRESENT INVENTION

Preferred embodiments of the present invention will now be described with reference to the accompanying drawings.

Referring to FIG. 6, the present invention uses a simultaneous multiple transmit-focusing method in order to enhance resolution without sacrificing frame rate. Unlike conventional methods that use short pulses, the simultaneous multiple transmit-focusing method is based on a pulse compression method that uses coded long codes. Orthogonal chirp signals Code 1 and Code 2 are simultaneously transmitted to and independently focused on transmission focal points Focal Point 1 and Focal Point 2. Upon reception, the reflected signals are separated according to their focal points. A lateral beam pattern of narrow width near the focusing positions is combined, thereby forming a beam pattern (a), which raises the resolution quality of the images.

The chirp signals used to focus beams at various positions are created by dividing up a frequency bandwidth and designed to be mutually orthogonal. A chirp signal can be compressed into a short pulse by a correlator and matched well with the frequency spectrum of an ultrasound transducer having a limited bandwidth. A chirp signal is also called a linear frequency modulation signal. Its instantaneous angular frequency ω varies linearly with time, i.e., $\omega=\omega_0+\mu t$, as expressed below:

$$s(t) = A\omega(t)e^{j(\omega_0 t + \frac{\mu}{2}t^2)} \qquad \text{Eq. 1}$$

where A is an arbitrary amplitude, $\omega_0$ is the center angular frequency, $\mu$ is the rate of change of the angular frequency with time, and w(t) is a window function that determines the envelope of chirp signal.

Figure 1:
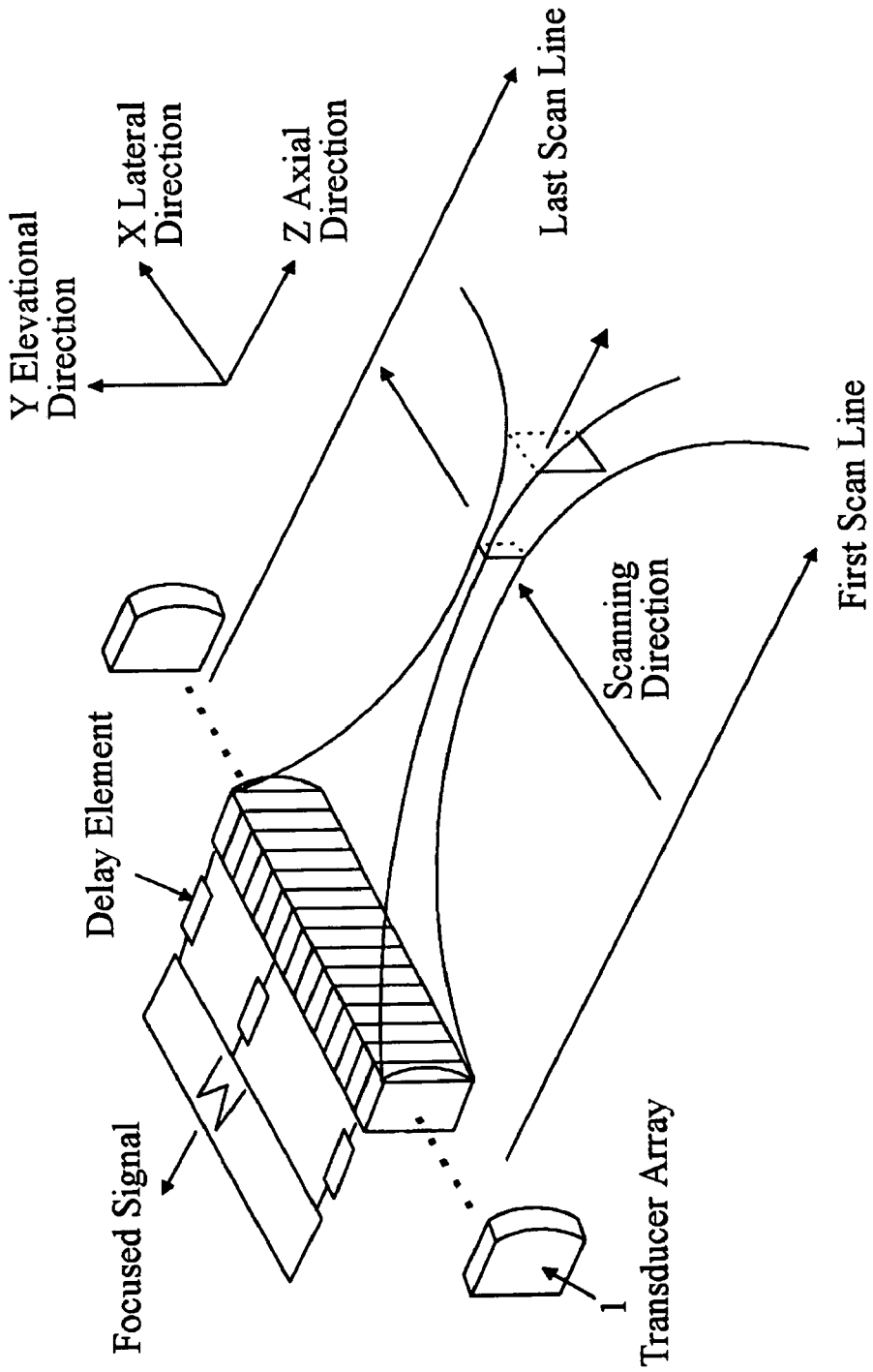
FIG. 1 illustrates a method for electronic scanning and electronic focusing using a conventional linear transducer array.
Figure 2A:
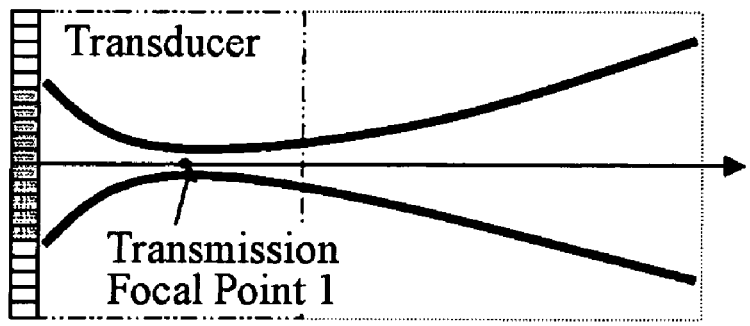
FIGS. 2A to 2C illustrate a conventional multiple transmit-focusing method.
Figure 2B:
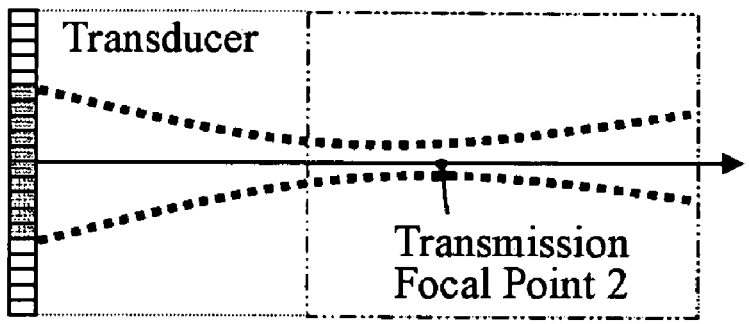
Figure 2C:
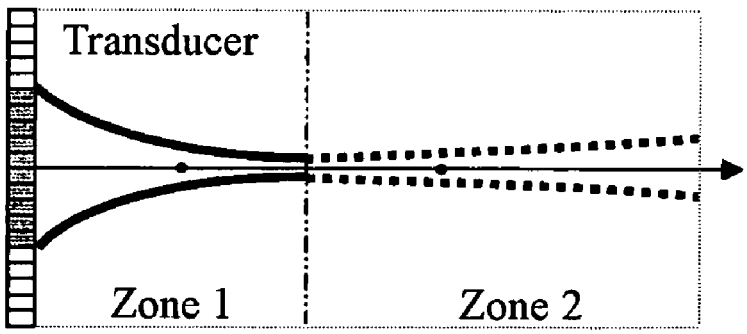
Figure 3:
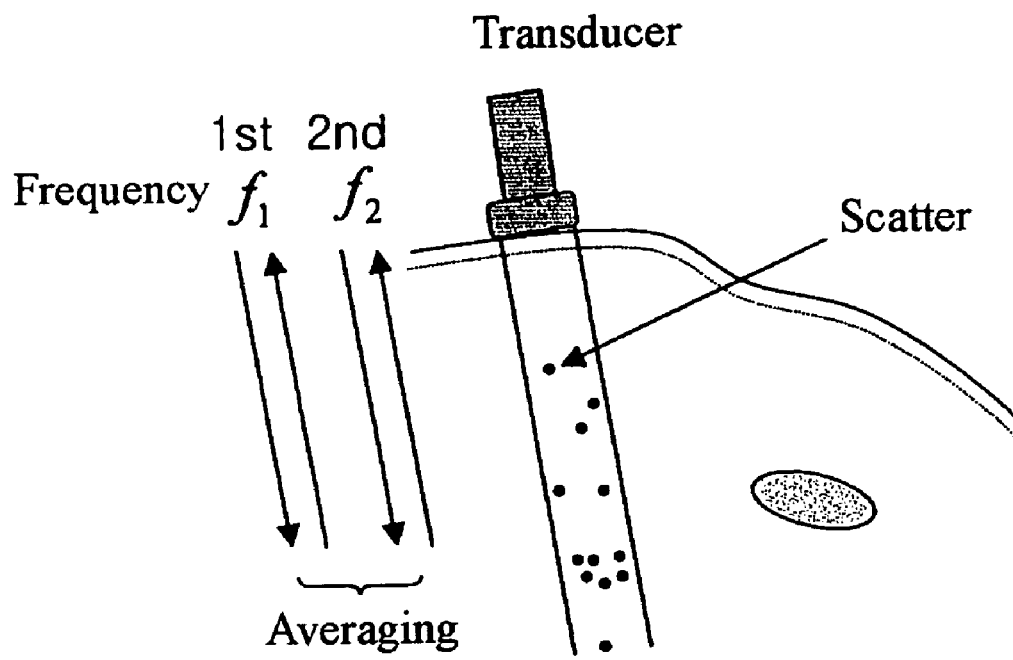
FIG. 3 illustrates a conventional frequency synthesizing method.
Figure 4A:
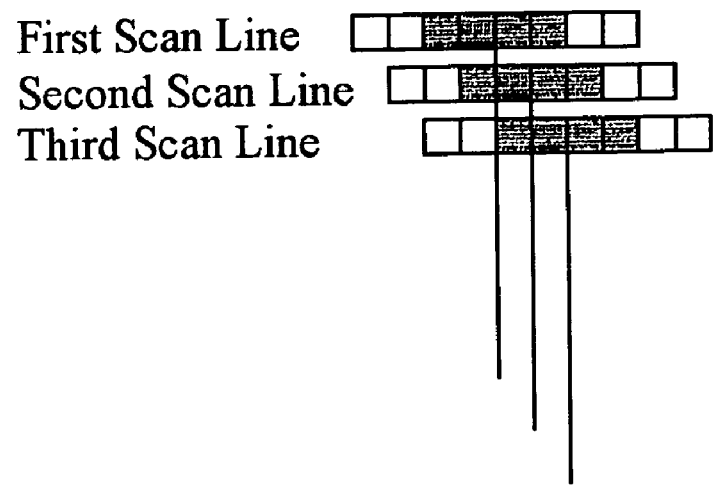
FIGS. 4A and 4B illustrate a method for obtaining scan lines in a conventional ultrasound imaging system.
Figure 4B:
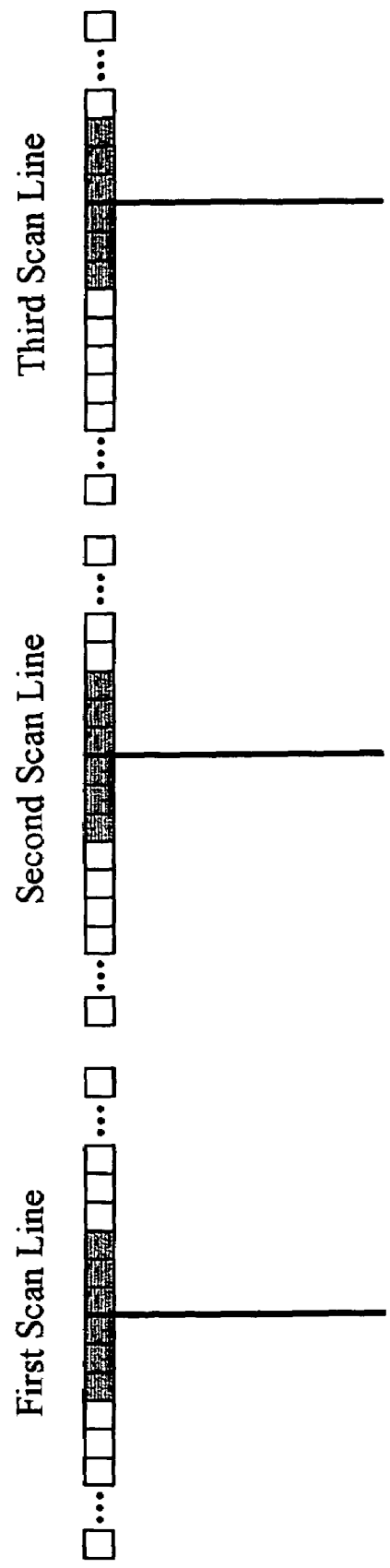
Figure 7A:
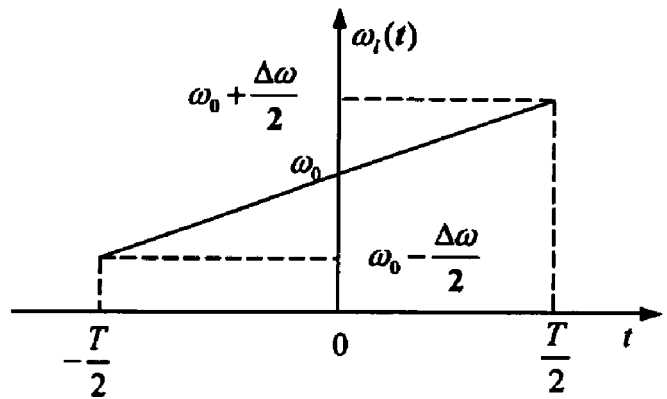
FIGS. 7A to 7C illustrate characteristics of the weighted chirp signals.
Figure 7B:
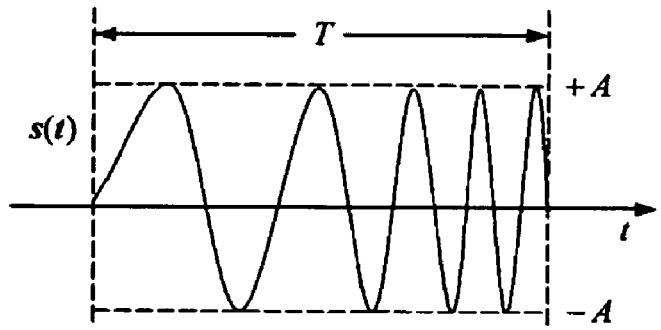
Figure 7C:
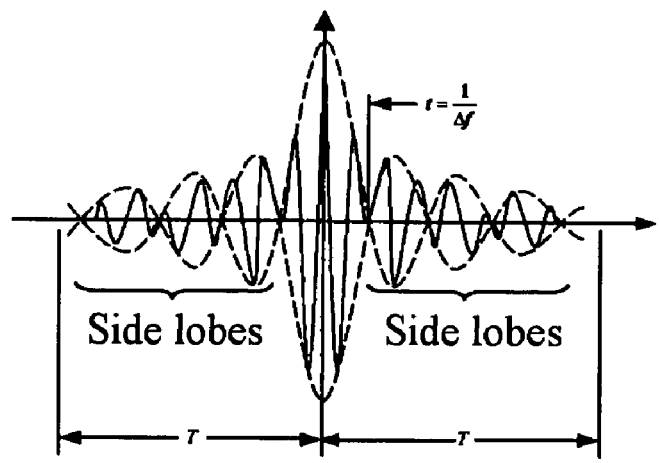

FIGS. 7A and 7B illustrate the instantaneous frequency and waveforms, respectively, of a chip signal weighted by rectangular window functions. FIG. 7C illustrates the waveform of the weighted chirp signal of FIG. 7B compressed through a correlator. The main-lobe width of the compressed chirp signal varies inversely with the frequency bandwidth of the original chirp signal. The side-lobe levels of the compressed chirp signal are affected by the weighting function. Thus, the frequency bandwidth and the weighting functions are critical factors in designing chirp signals.

In order to separate signals simultaneously focused at various focal points, the signals must be orthogonal to each other. According to an embodiment of the present invention, orthogonal chirp signals, which have excellent compression characteristics, are used as transmission signals. Chirp signals may be easily designed to have the desired frequency bandwidth matching the frequency spectrum of an ultrasound transducer having limited bandwidth and have the following property:

$$s_i(t) \otimes s_j*(-t) = \begin{cases} \delta(t), i = j \\ 0, i \neq j \end{cases} \qquad \text{Eq. 2}$$

where $S_i$ and $S_j$ stand for i-th and j-th signals respectively, "$\otimes$" means time convolution, and "*" is the complex conjugate. Eq. 2 shows the correlation of $S_i$ and $S_j$. If the two signals $S_i$ and $S_j$ are identical to each other, the correlation function is a delta function, which is as an ideal compression property. If the two signals $S_i$ and $S_j$ are different, the correlation function is 0, indicating complete orthogonality.

Figure 8:
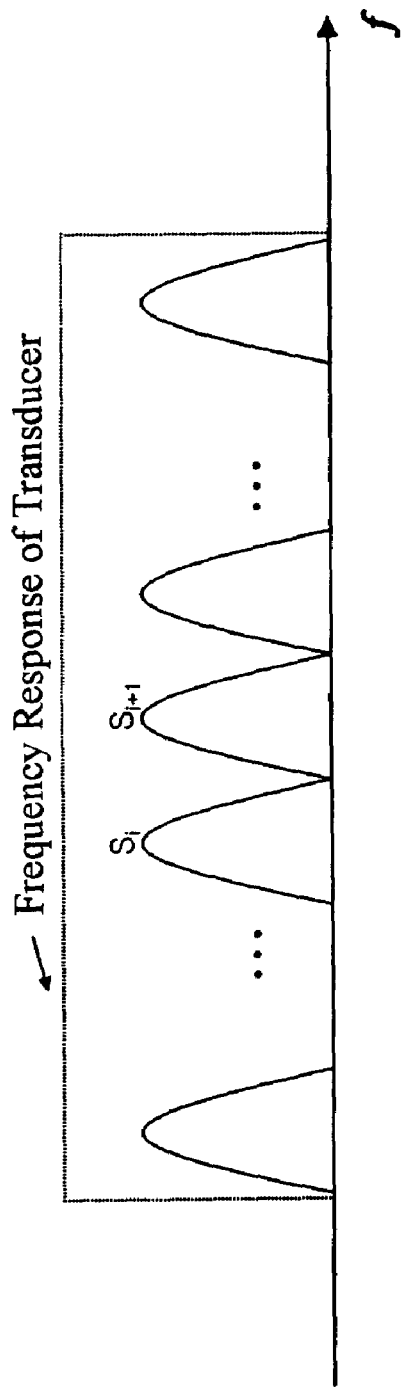
FIG. 8 shows mutually orthogonal weighted chirp signals within a limited frequency bandwidth of an ultrasound transducer.

Referring to FIG. 8, the respective chirp signals, illustrated by solid lines, are arranged to be orthogonal and not overlap each other. $S_i$ represents the frequency spectrum of an i-th chirp signal. A Hanning window function is used to weight all of the chirp signals. The frequency response of the transducer, defined by the dotted line, is expressed as a rectangular function.

If the limited frequency bandwidth is excessively divided to produce chirp signals, then the chirps signals will have relatively reduced frequency bandwidth. This results in an increase of the main-lobes of the compressed signals. Increased main-lobes may have a negative impact on the axial resolution of ultrasound images. Thus, the number of signals is practically limited by the bandwidth. Chirp signals should be designed with maximum bandwidth and minimum correlation so they can be easily separated from each other.

In accordance with the present invention, as many transmission signals as possible are generated within a given bandwidth such that two adjacent signals in a frequency zone share a broad frequency bandwidth. The cross-correlation value of two adjacent signals is less than 40 dB with references to the maximum autocorrelation values of the respective signals. Furthermore, the shared frequency bandwidth, i.e., the overlapping of two adjacent transmission signals, varies with the bandwidth of the signals and the weighted window function. With Hanning window functions, the present invention can obtain a 25% overlap of the 30 dB bandwidth through a pulse compressor, which meets a preference in medical image display systems for side-lobes of –40 dB or less.

Figure 9:
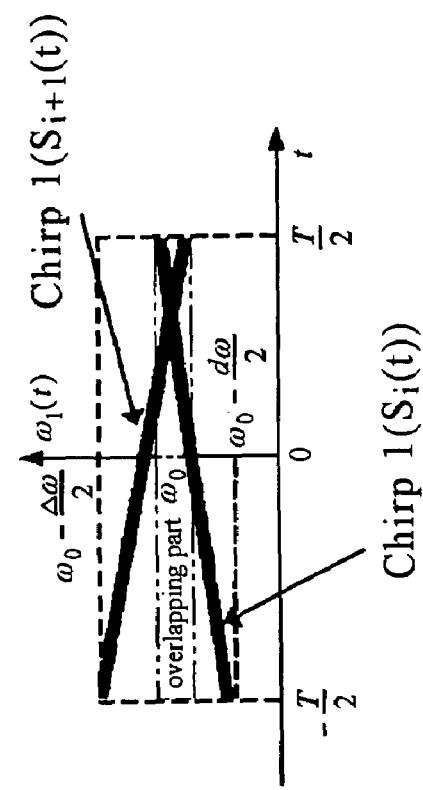
FIG. 9 shows the time-dependent frequency variation of two adjacent mutually orthogonal chirp signals.

Referring to FIG. 9, adjacent weighted chirp signals Chirp1 and Chirp2, with overlapping bandwidths, are designed to have opposite time-dependent frequency variations, i.e., the frequency of signal $S_i(t)$ increases with time, while the frequency of the other signal $S_{i+1}(t)$ decreases with time. Signals $S_i(t)$ and $S_{i+1}(t)$ are produced by dividing the frequency bandwidth of a transducer into two parts. Some parts overlap each other within a limit that permits side-lobes of –40 dB or less so that the bandwidth of each signal increases.

As designed above, chirp signals have different frequency bands, which affect the resolution of the image. Main-lobe width x determines the lateral resolution in an ultrasound image as follows:

$$\chi = 2\frac{\lambda z}{D} = 2\left(\frac{v}{f}\right)\frac{z}{D} \qquad \text{Eq. 3}$$

where λ is the wavelength, z is the proceeding depth, D is the size of the aperture of a transducer, v is the ultrasound speed, and f is the frequency. As shown in Eq. 3, the frequency band and position of a chirp signal determine the lateral resolution. The main-lobe width x is inversely proportional to the frequency f and directly proportional to the depth z. Thus, the lateral resolution is better near field at high frequencies.

In order to keep a uniform lateral resolution in the present invention, low frequency signals are focused near field and high frequency signals are focused far field. Consequently, the present invention can achieve remarkably high signal-to-noise ratio (SNR) levels compared to a conventional pulse focusing method. Thus, in the present invention, one can obtain an SNR with high frequencies that is the same level as in the pulse focusing method using low frequency far field. Alternatively, low frequencies can be focused far field and high frequency can be focused at near field, depending on user requirements.

Figure 10:
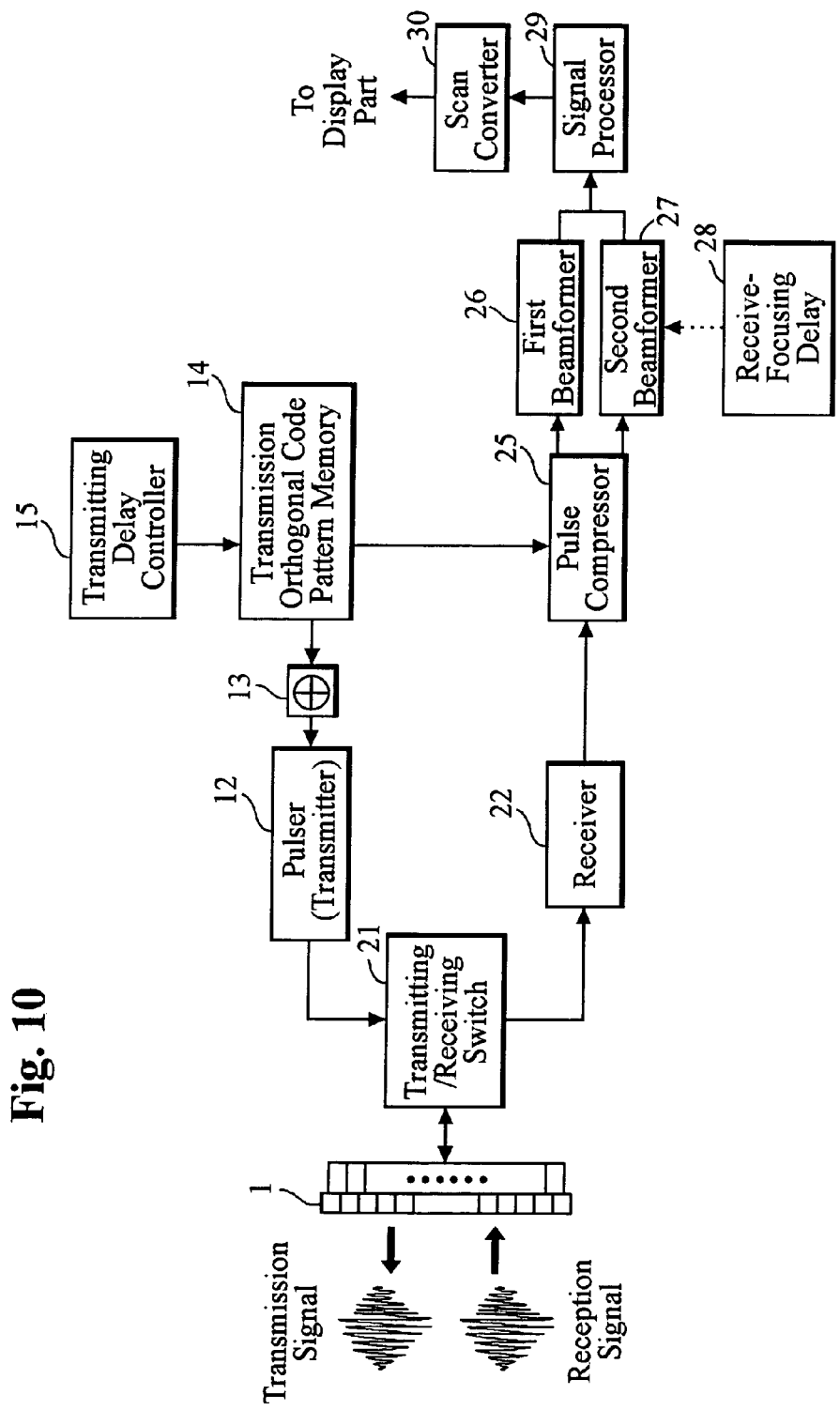
FIG. 10 is a block diagram of an ultrasound imaging system capable of simultaneous multiple transmit-focusing in accordance with one embodiment of the present invention.
Figure 11:
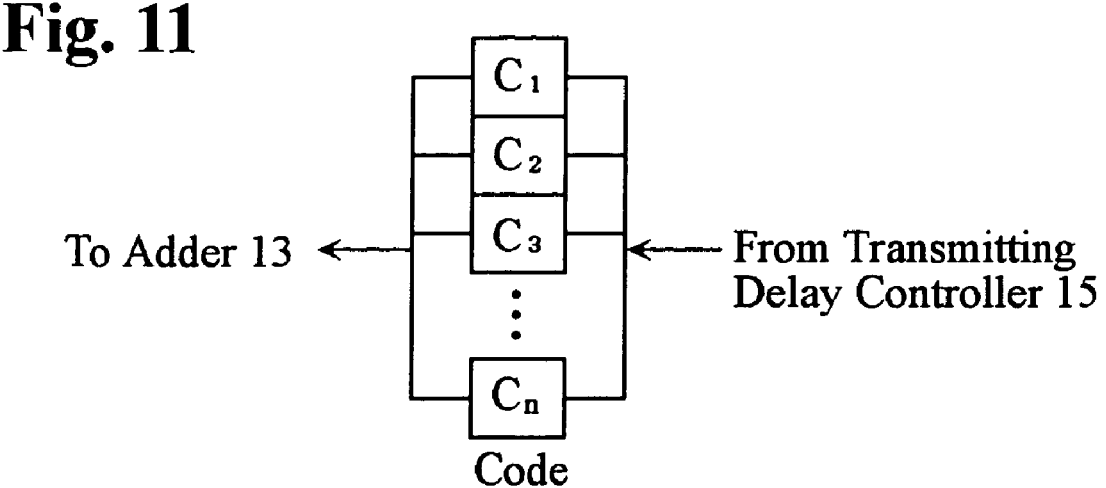
FIG. 11 illustrates a plurality of code patterns stored in the transmission orthogonal code pattern memory 14 of FIG. 10.

Referring to FIG. 10, the present invention employs a weighted chirp signal instead of a conventional linear chirp signal. The chirp signal is weighted by Hanning window functions. Although the chirp signals of the present invention are weighted by Hanning window functions, other window functions, such as Hanning window functions, Blackman window functions, and Kaiser window functions, are also applicable.

Pulser or ultrasound transmitter 12 receives a transmission signal pattern stored in transmission orthogonal code pattern memory 14, amplifies the pattern, and transfers it to transducer array 1. Pulser 12 linearly amplifies arbitrary signals. Transmission orthogonal code pattern memory 14 stores weighted chirp signals as transmission signal patterns.

Referring to FIGS. 10, 11, 12, and 13, chirp signals are stored in the form of n number of orthogonal codes. First code C1, second code C2, third code C3 and fourth code C4 are orthogonal to each other and have the frequency characteristics shown in FIG. 9. For example, if first code C1 is a chirp signal ascending from low frequency to high frequency, then second code C2 is a chirp signal descending from high frequency to low frequency.

Transmission delay controller 15 determines the delay pattern for ultrasound transmission by computing delay values with respect to various focal points, as selected by the user. Adder 13 extracts respective transmission orthogonal codes C1–Cn from transmission orthogonal code pattern memory 14. The orthogonal codes are added with reference to the delay time with respect to the corresponding transmission focal points and are transmitted to a target object by transducer array 1 through pulser 12.

Transducer array 1 consists of k number of transducer elements, and transmits and receives ultrasound pulses. After passing transducer array 1, received signals, including all orthogonal codes, travel through transmitting/receiving switch 21. They are transmitted to receiver 22, which includes a time gain compensator (TGC) and an analogue-to-digital converter (ADC) in each channel. Transmitting/receiving switch 21 acts as a duplexer that protects receiver 22 from high voltage power released from pulser 12. Switch 21 switches transducer array 1 between pulser 12 and receiver 22 when transducer array 1 performs transmission and reception, respectively.

Receiver 22 transmits received signals to pulse compressor 25. Pulse compressor 25 inputs pulse-compressed signals to first and second beamformers 26 and 27. First and second beamformers 26 and 27 perform receive-focusing with reference to the delay values of receive-focusing delay 28. Signal processor 29 produces signals capable of forming B-mode images by performing envelope detection and log compression. Scan converter 30 converts the B-mode image into an image format to display on an actual monitor.

Figure 12:
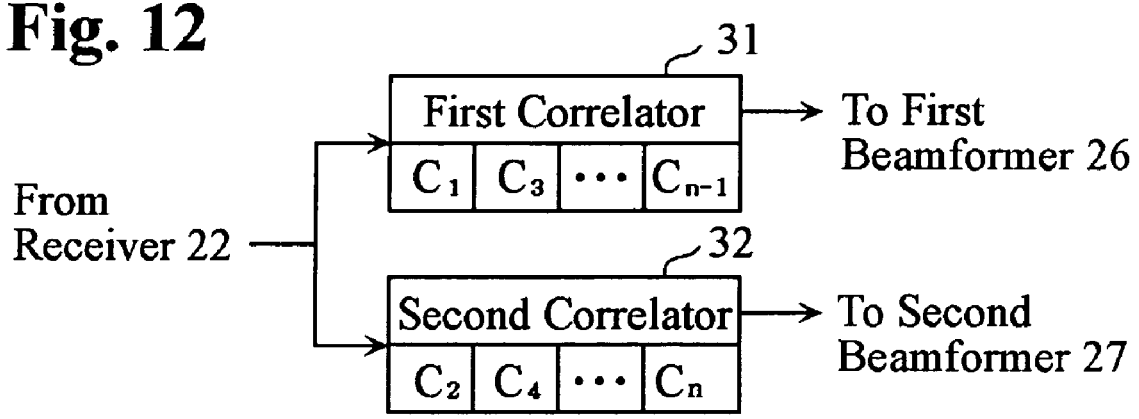
FIG. 12 illustrates a system architecture of the correlator inside the pulse compressor 25 of FIG. 10.
Figure 13:
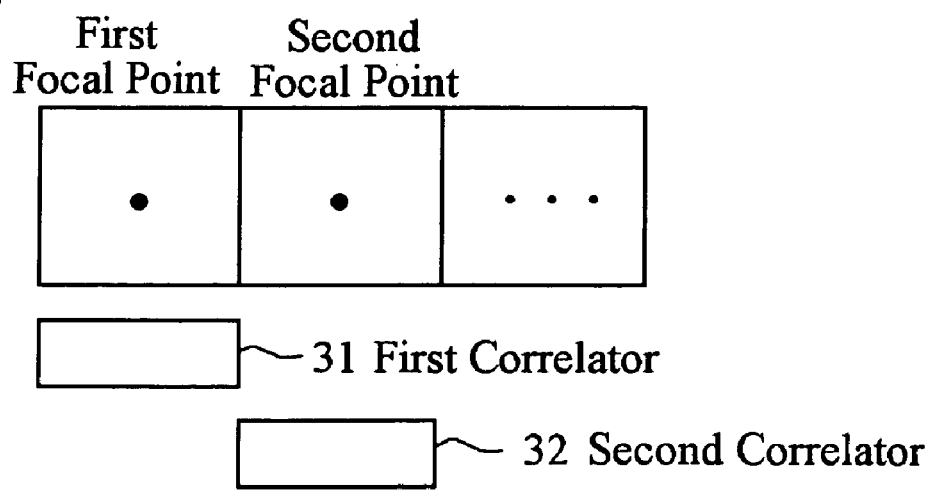
FIG. 13 shows the variation of coefficients applied to the first and the second correlators in order to separate and compress the orthogonal codes with respect to the transmission focal points.

Referring to FIG. 12, in order to compress long coded signals into short pulse signals, pulse compressor 25 passes received weighted orthogonal chirp signals through first and second correlators 31 and 32. Odd numbered codes, such as first code C1 and third code C3, are pulse-compressed by first correlator 31. Even numbered codes, orthogonal to the odd numbered codes, such as second code C2 and fourth code C4, are pulse-compressed by second correlator 32.

The ultrasound imaging system shown in FIG. 10 has one correlator and one beamformer for each of two adjacent transmission focal points. According to the present invention, simultaneous multiple transmit-focusing is implemented by means of two correlators 31 and 32 and two beamformers 26 and 27.

Variation of coefficients are applied to first correlator 31 and second correlator 32 in order to separate and compress the orthogonal codes for all transmission focal points. The received signals are compressed at each channel and simultaneously separated by correlators 31 and 32. For a coefficient of first correlator 31, transmission code C1 is used with respect to the first focal point, and transmission code C3 is used with respect to the second focal point. For a coefficient of second correlator 32, the transmission codes are selected alternatively with first correlator 31, i.e., transmission code C2 is used with respect to the second focal point and transmission code C4 is used with respect to the fourth focal point. Signals compressed at each channel and separated by the correlators are receive-dynamic focused by beamformers 26 and 27. These focused signals are selected based on distance during an echo-processing step and are combined into one signal. As the present invention employs two sets of correlators and beamformers and some correlation regions of first correlator 31 and second correlator 32 overlap, the two images may be combined without error.

Figure 14A:
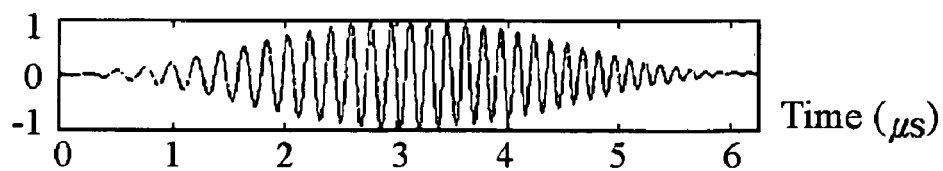
FIGS. 14A to 14D show waveforms and frequency characteristics of two weighted chirp signals as applied in accordance with the present invention.
Figure 14B:
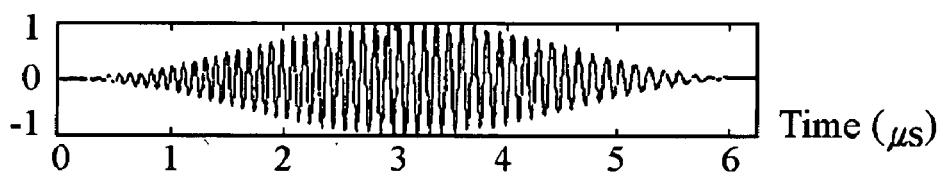
Figure 14C:
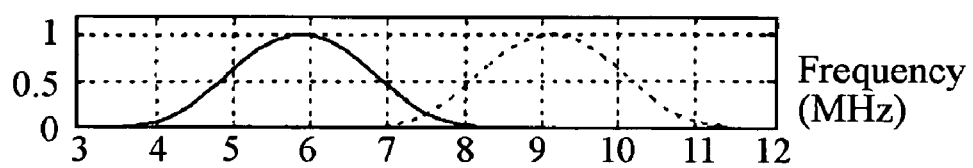
Figure 14D:
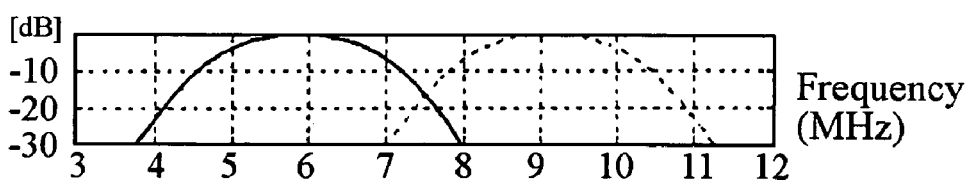

FIGS. 14A to 14D illustrates waveforms and frequency characteristics of two weighted chirp signals in the present invention. FIGS. 14A and 14B show time-dependent waveforms of first transmission chirp signal C1 and second transmission chirp signal C2. FIGS. 14C and 14D show frequency characteristics of chirp signals C1 and C2. First chirp signal C1 is a low frequency signal and illustrated by a solid line in FIGS. 14C and 14D. Second chirp signal C2 is a high frequency signal and illustrated by a dotted line in FIGS. 14C and 14D. Second chirp signal C2 is orthogonal to first chirp signal C1.

Figure 15A:
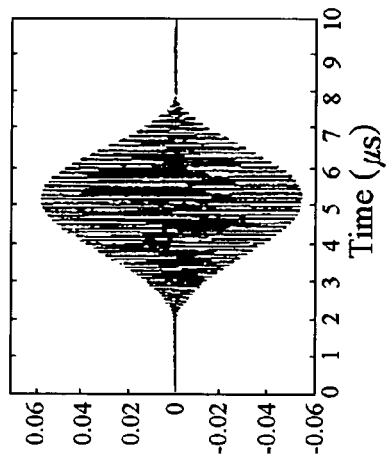
FIGS. 15A to 15F show data obtained by independently transmitting the respective chirp signals shown in FIG. 14.
Figure 15B:
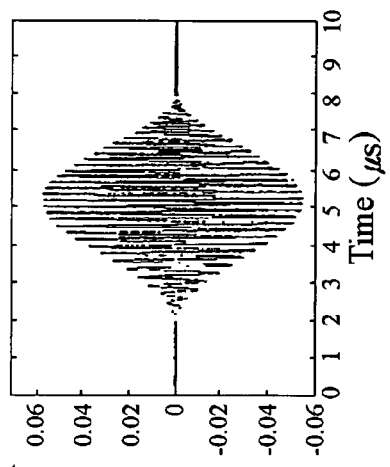
Figure 15C:
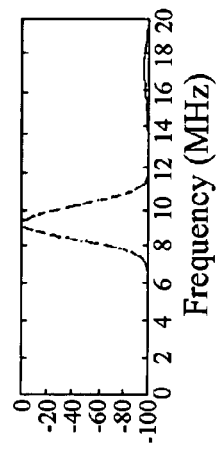
Figure 15D:
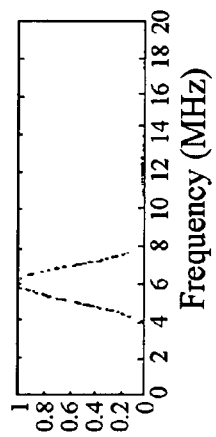
Figure 15E:
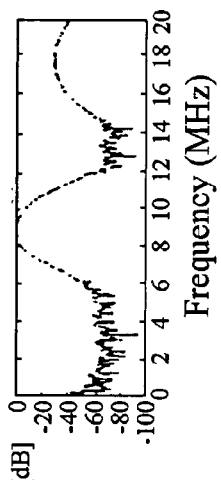
Figure 15F:
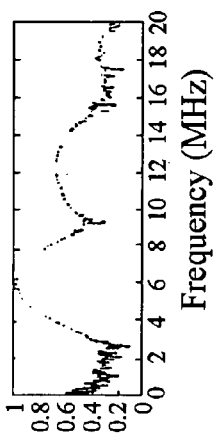

FIGS. 15A to 15F illustrate data obtained by independently transmitting chirp signals C1 and C2 shown in FIGS. 14A to 14D. FIGS. 15A and 15B are time-dependent waveforms of received signals with respect to two chirp signals C1 and C2. FIGS. 15C and 15D show frequency characteristics of two chirp signals C1 and C2.

Referring to FIGS. 15A to 15F, the 30 dB bandwidth of a received signal with respect to first transmission chirp signal C1 is less than that of second transmission chirp signal C2, and loss in bandwidth appears at both ends of the transducer frequency band. Further, bandwidth loss is greater in high frequency second transmission chirp signal C2 than in low frequency first transmission chirp signal C1 since attenuation is greater at higher frequencies.

FIGS. 15B and 15C show the basic frequency of chirp signals C1 and C2 and a harmonic frequency in a frequency band that is two times the center frequency. A harmonic is produced by the non-linear characteristics of a medium when a signal travels through the medium. In this invention, production of harmonics is limited since the harmonic frequency along the cross-correlation of two signals may interfere with other signals. Consequently, a peak voltage of the transmission signal is designed at a low frequency band or the frequency of the harmonic is designed not to overlap with the correlation coefficient. If the frequency band of the harmonic frequency surpasses the frequency band of the transducer array, the harmonic frequency may be filtered and removed by the transducer array upon reception.

According to the present invention, orthogonal chirp signals are added with reference to a time delay and are simultaneously transmitted. On reception, they may be completely separated. FIGS. 16A to 16G illustrate complete separation of the reflected signals after simultaneous transmission. The drawings illustrate waveforms and frequency characteristics of the received signals of the transmission of two chirp signals C1 and C2 added without a time delay, and the time-dependent waveform and frequency characteristics of a correlation function.

Figure 16A:
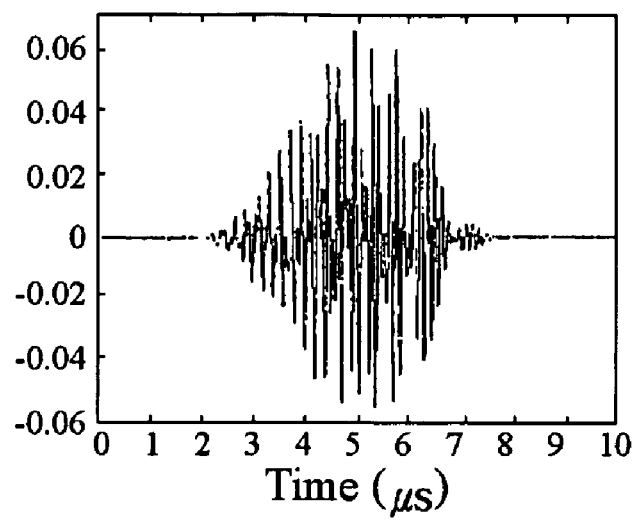
FIGS. 16A to 16G show the time-dependent waveform and frequency characteristic of the received signal and correlation function, where two chirp signals C1 and C2 (shown in FIGS. 14A to 14D) are added without a time delay and transmitted.
Figure 16B:
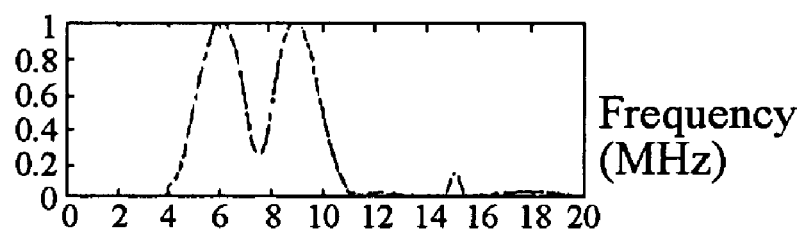
Figure 16C:
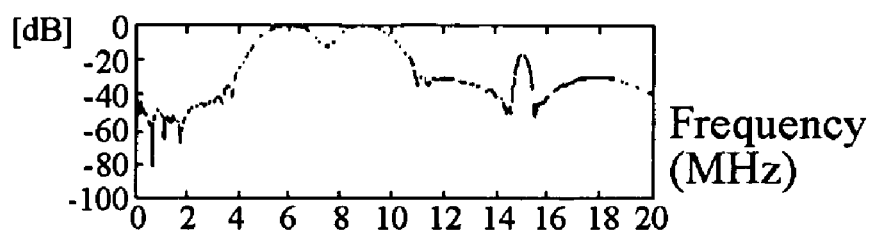
Figure 16E:
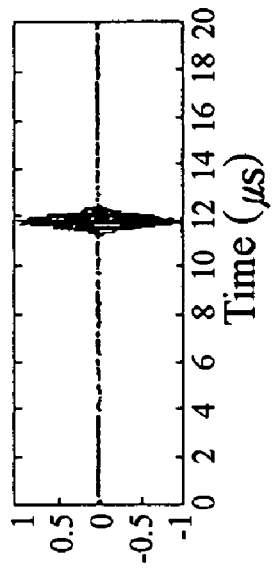
Figure 16G:
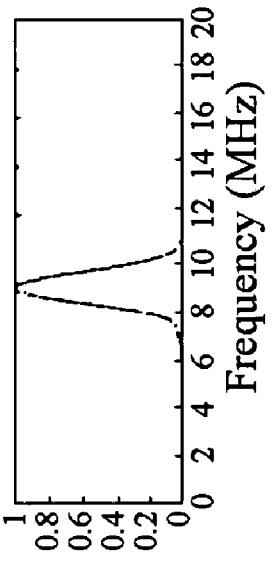
Figure 16D:
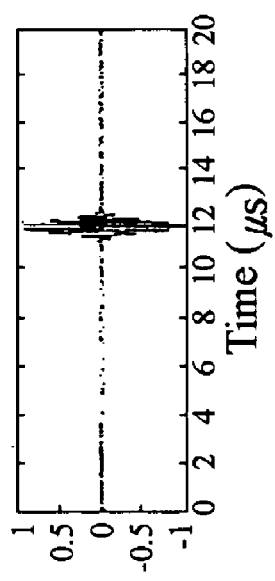
Figure 16F:
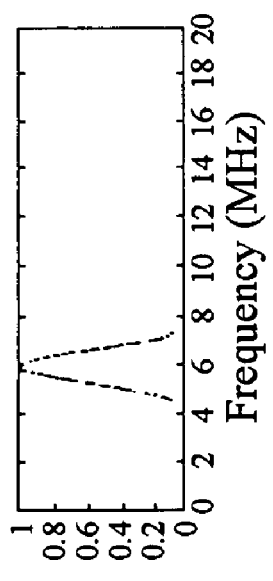

Referring to FIGS. 16B and 16C, the frequency bandwidths of the chirp signals may be determined from the frequency of the received signals. FIG. 16D shows the time-dependent waveform of the correlation function of first transmission chirp signal C1. FIG. 16F shows the frequency characteristics of the correlation function of first transmission chirp signal C1. FIG. 16E shows the time-dependent waveform of the correlation function of second transmission chirp signal C2. FIG. 16G shows the frequency characteristics of the correlation function of second transmission chirp signal C2. Referring to FIGS. 16D to 16G, first chirp signal C1 and second chirp signal C2 are completely separated by correlators 31 and 32, respectively.

Figure 17A:
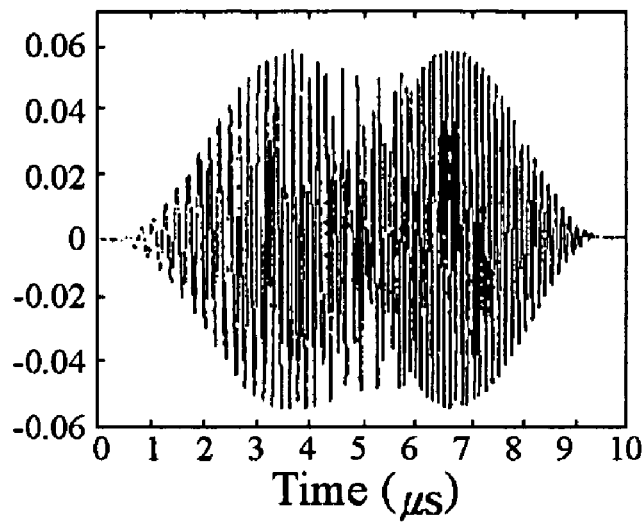
FIGS. 17A to 17G show the time-dependent waveform and frequency characteristic of the received signal and correlation function, where two chirp signals C1 and C2 (shown in FIGS. 14A to 14D) are added with a time delay and transmitted.
Figure 17B:
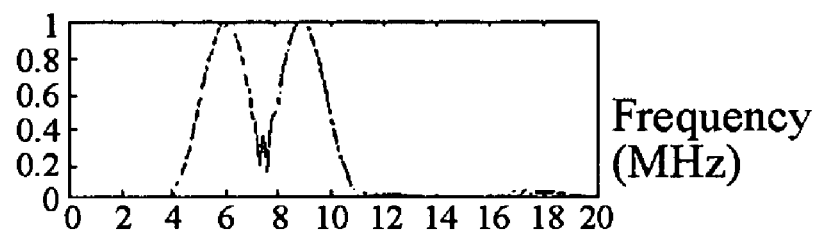
Figure 17C:
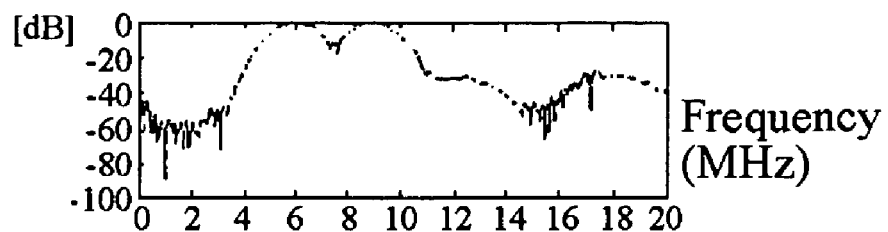
Figure 17D:
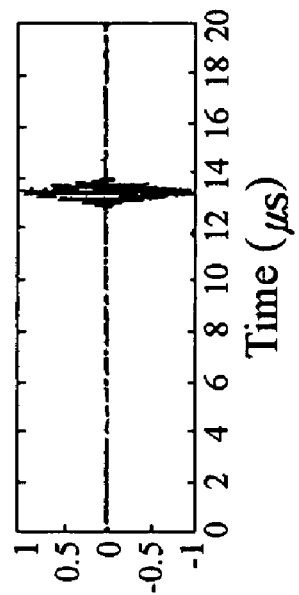
Figure 17E:
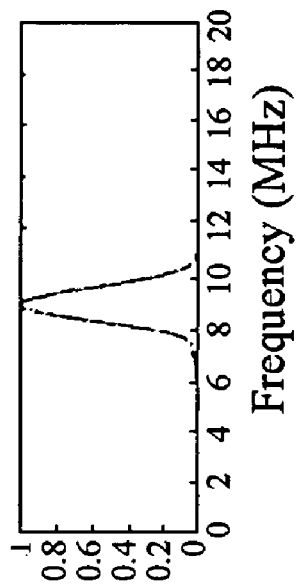
Figure 17F:
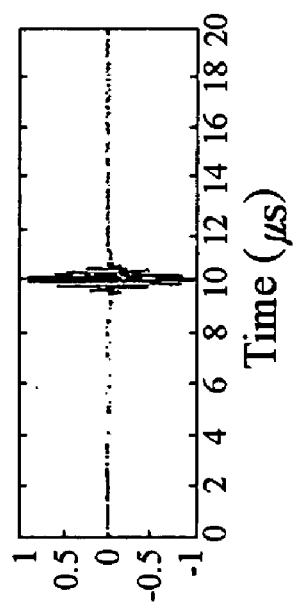
Figure 17G:
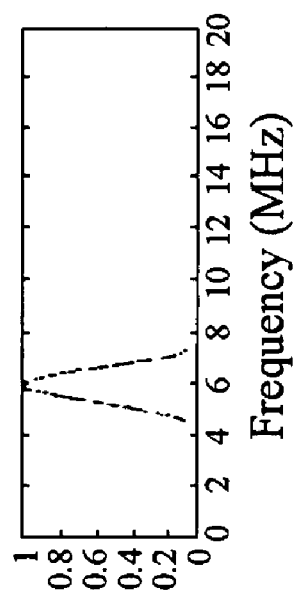

FIGS. 17A to 17G show the frequency characteristics and time-dependent waveforms of the received signal and correlation function of the transmission of first transmission chirp signal C1 second transmission chirp signal C2 added with a time delay. FIG. 17A shows the waveform of the received signal. FIG. 17B shows the frequency characteristics of the received signal. FIG. 17C shows the frequency characteristics of the received signal on a log scale [dB]. FIG. 17D shows the time-dependent waveform of the correlation function of first transmission chirp signal C1. FIG. 17E shows the time-dependent waveform of the correlation function of second transmission chirp signal C1. FIG. 17F shows the frequency characteristics of the correlation function of first transmission chirp signal C1. FIG. 17G shows the frequency characteristics of the correlation function of second transmission chirp signal C2. FIGS. 17A to 17G show two chirp signals, which added with a time delay and transmitted, completely separated by correlators 31 and 32 (shown in FIG. 12).

According to another embodiment of the ultrasound imaging system shown in FIG. 10, received signals passed through the TGC and the ADC at each channel are dynamic-focused by a beamformer. They are separated into each orthogonal code according to depth by two correlators and compressed into short signals. This implementation may provide relatively lower image quality than that of the system shown in FIG. 10. However, by altering the order of correlators and beamformers, only one set of beamformer and two correlators are required. This results in a simplification of the hardware configuration of the receiver.

FIGS. 14A to 17G show that transmission signals to be focused at different focal points are simultaneously transmitted and are separated on reception, thereby improving the resolution of the ultrasound imaging system without sacrificing frame rate.

Figure 18:
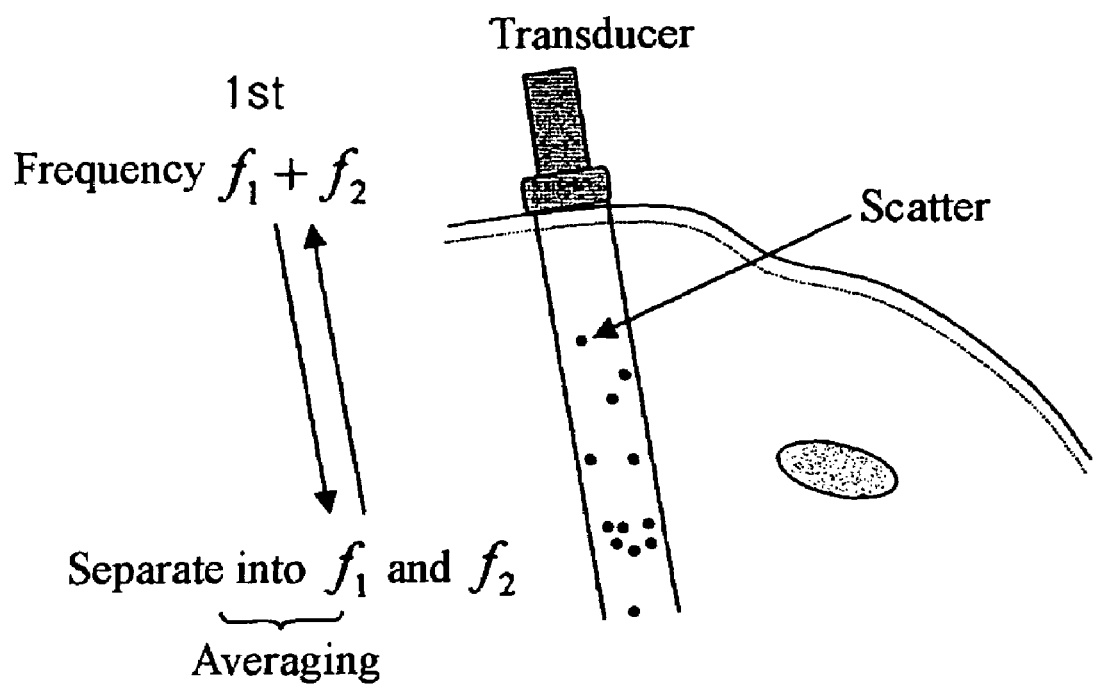
FIG. 18 illustrates a frequency compounding method using the simultaneous multiple transmit-focusing method with weighted orthogonal chirp signals.

FIG. 18 illustrates frequency compounding in the simultaneous multiple transmit-focusing method by means of the weighted orthogonal chirp signals. Referring to FIG. 18, according to the simultaneous multiple transmit-focusing method using the weighted orthogonal chirp signal of the present invention, speckle patterns may be reduced such that orthogonal chirp signals of various frequency bands are simultaneously transmit-focused to a desired region. Received signals are separated and compressed by the respective correlators. The separated/compressed signals having different frequency bands are averaged. By obtaining the above result in only one instance of transmission/reception, the frame rate is not lowered.

Figure 19:
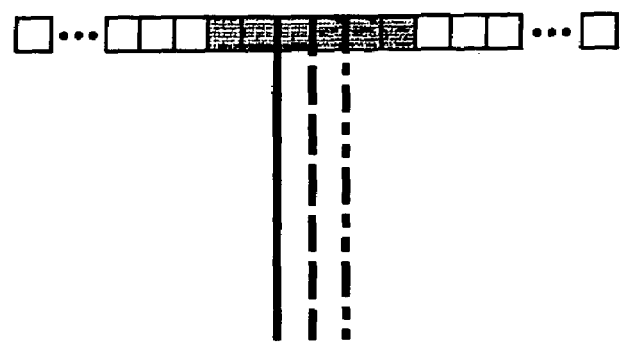
FIG. 19 illustrates a method for obtaining multiple scan lines with a single transmission/reception process by the simultaneous multiple transmit-focusing of orthogonal codes.

FIG. 19 illustrates a method for obtaining several scan lines with a single transmission/reception process by simultaneous multiple transmit-focusing orthogonal codes. Although FIG. 19 is an example of obtaining three scan lines using three orthogonal codes, the present invention is not limited thereto. More orthogonal codes and scan lines may be involved. Different orthogonal codes are simultaneously transmitted to each scan line. The signals are separated by a correlator upon reception, thereby obtaining scan lines by independent codes and improving frame rates. Here, the orthogonal codes have transmit delays with respect to their corresponding scan lines, and different receive delays must be applied to the scan lines during the receive dynamic-focusing step.

Based on simultaneous multiple transmit-focusing method using weighted orthogonal chirp signals, the present invention is capable of enhancing resolution without sacrificing frame rate because ultrasound transmission/reception does not have to be performed for each scan line as many times as the number of focal points. According to the present invention, multiple transmission signals are simultaneously transmitted to a plurality of focal points and received signals are separated upon reception, thereby improving resolution without sacrificing frame rate.

Furthermore, the simultaneous multiple transmit-focusing method is also applicable to the 1.5-D transducer array shown in FIG. 5B. Degradation of the elevational resolution at locations outside the fixed focal points is avoided. The method is not limited to 1.5-D transducer arrays but applicable to 1.25-D, 1.5-D, 1.75-D and 2-D transducer arrays.

The frequency compounding method may also be applied without sacrifice in the frame rate since the present invention uses a simultaneous multiple transmit-focusing method using the weighted orthogonal chirp signals.

In addition, since the weighted chirp signals are designed in accordance with the frequency bandwidth division method, the frequency variations with time of adjacent weighted chirp signals are arranged in an alternative manner and bandwidths thereof overlap by a predetermined width so that the chirp signals are orthogonal.

While the present invention has been shown and described with respect to the particular embodiments, it will be apparent to those skilled in the art that many changes and modifications may be made without departing from the spirit and scope of the invention as defined in the appended claims. Although, the present invention is illustrated with examples of the weighted chirp signals as orthogonal codes, other orthogonal codes such as the Golay codes can be used.

The invention claimed is:

1. An ultrasound imaging system for forming an ultrasound image of a target object comprising:
   means for storing N number of chirp signals, said chirp signals being weighted by one window function selected from the group consisting of Hanning, Hamming, Blackman and Kaiser window functions;
   means for simultaneously transmitting the N number of chirp signals as ultrasound transmission signals to a corresponding N number of focal points within a target object, the N number of chirp signals being modified when propagating through the target object;
   means for receiving signals reflected from the N number of focal points corresponding to the transmitted signals, the received signals including the modified N number of chirp signals;
   means for extracting the modified N number of chirp signals from the received signals;
   means for pulse-compressing the modified N number of chirp signals; and
   means for receive-focusing the pulse-compressed signals.

2. The ultrasound imaging system of claim 1 wherein the chirp signals further comprise:
   a first transmission chirp signal whose frequency is transitional from a low frequency to a high frequency; and
   a second transmission chirp signal whose frequency is transitional from a high frequency to a low frequency.

3. The ultrasound imaging system of claim 1 wherein the chirp signals make a first signal with a low frequency band focused at a field near the transmitting means and the receiving means, and a second signal with a high frequency band focused at a field far from the transmitting means and the receiving means.

4. The ultrasound imaging system of claim 1 wherein the pulse-compressing means further comprises:
   a first correlator for pulse-compressing odd-numbered signals among the N number of chirp signals; and
   a second correlator for pulse-compressing even-numbered signals among the N number of chirp signals.

5. The ultrasound imaging system of claim 4, further including:
   a first beamformer connected to a first correlator for producing receive-focused signals from the pulse-compressed signals of the odd numbered signals; and
   a second beamformer connected to the second correlator for producing receive-focused signals from the pulse-compressed signals of the even numbered signals.

6. The ultrasound imaging system of claim 1 wherein the chirp signals simultaneously make a plurality of scan lines by means of the N number of orthogonal signals.

7. The ultrasound imaging system of claim 6 wherein simultaneously making the plurality of scan lines is applicable to 1.25-D, 1.5-D, 1.75-D and 2-D transducer arrays.

8. An ultrasound imaging method for forming an ultrasound image of a target object, comprising the steps of:
   preparing N number of chirp signals, said chirp signals being weighted by one window function selected from the group consisting of Hanning, Hamming, Blackman and Kaiser window functions;
   simultaneously transmitting the N number of chirp signals as ultrasound transmission signals to a corresponding N number of focal points within a target object, the N number of chirp signals being modified when propagating through the target object;
   receiving signals reflected from the N number of focal points corresponding to the transmitted ultrasound signals, the received signals including the modified N number of chirp signals;
   extracting the modified N number of chirp signals from the received signals;
   pulse-compressing the modified N number of chirp signals; and receive-focusing the pulse-compressed signals.

9. The ultrasound imaging method of claim 8 wherein the chirp signals further comprise:
   a first transmission chirp signal whose frequency is transitional from a low frequency to a high frequency; and
   a second transmission chirp signal whose frequency is transitional from a high frequency to a low frequency.

10. The ultrasound imaging method of claim 8 wherein the chirp signals form a first signal with a low frequency band focused at a near field within the target object, and a second signal with a high frequency band focused at a far field within the target object.

11. The ultrasound imaging method of claim 8 further including the steps of:
    pulse-compressing odd-numbered signals among the N number of chirp signals; and
    pulse-compressing even-numbered signals among the N number of chirp signals.

12. The ultrasound imaging method of claim 8 wherein the chirp signals simultaneously make a plurality of scan lines by mean of the N number of orthogonal signals.

13. The ultrasound imaging method of claim 12 wherein simultaneously making the plurality of scan lines is applicable to 1.25-D, 1.5-D, 1.75-D and 2-D transducer arrays.

* * * * *